United States Patent
Vanderhaegen (10) Patent No.: US 10,727,899 B2
(45) Date of Patent: Jul. 28, 2020

(54) CROSSTALK MITIGATION FOR OUT-OF-BAND TONES

(71) Applicant: Alcatel Lucent, Nozay (FR)

(72) Inventor: Dirk Vanderhaegen, Wemmel (BE)

(73) Assignee: Alcatel Lucent, Nozay (FR)

( * ) Notice: Subject to any disclaimer, the term of this patent is extended or adjusted under 35 U.S.C. 154(b) by 37 days.

(21) Appl. No.: 16/307,265

(22) PCT Filed: May 30, 2017

(86) PCT No.: PCT/EP2017/063013
§ 371 (c)(1),
(2) Date: Dec. 5, 2018

(87) PCT Pub. No.: WO2017/211619
PCT Pub. Date: Dec. 14, 2017

(65) Prior Publication Data
US 2019/0305816 A1    Oct. 3, 2019

(30) Foreign Application Priority Data
Jun. 9, 2016 (EP) .................... 16305678

(51) Int. Cl.
*H04B 3/32* (2006.01)
*H04M 3/34* (2006.01)
(Continued)

(52) U.S. Cl.
CPC ............ *H04B 3/32* (2013.01); *H04M 3/26* (2013.01); *H04M 3/306* (2013.01); *H04M 3/34* (2013.01); *H04M 11/062* (2013.01)

(58) Field of Classification Search
CPC ......... H04B 3/32; H04B 3/487; H04M 3/306; H04M 3/34
(Continued)

(56) References Cited

U.S. PATENT DOCUMENTS

2014/0254791 A1* 9/2014 Wei .............. H04M 11/062
                                                         379/406.01
2015/0288811 A1* 10/2015 Kerpez ................ H04B 3/32
                                                            379/28
(Continued)

FOREIGN PATENT DOCUMENTS

EP          3012979 A2    4/2016
WO     WO-99/52239 A1   10/1999

OTHER PUBLICATIONS

Maes et al (Pilot-Based Crosstalk Channel Estimation for Vector-Enabled VDSL Systems, IEEE 2010) (Year: 2010).*

(Continued)

*Primary Examiner* — Omer S Mian
(74) *Attorney, Agent, or Firm* — Harness, Dickey & Pierce, P.L.C.

(57) ABSTRACT

The method includes inputting first groups of frequency samples to be transmitted over, respectively received from, first and second subsets of subscriber lines at respective first tones and following a first group selection order, alternated with mirrored second groups of frequency samples to be transmitted over, respectively received from, the second subset of subscriber lines at respective mirrored second tones of the first tones, and following a mirrored second group selection order of the first group selection order, to a vectoring processor for joint mitigation of first crosstalk present over the first and second subsets of subscriber lines at the respective first tones and second crosstalk present over the second subset of subscriber lines at the respective second tones. The first tones are common to the first and second transmit spectra. Mirroring is with respect to a folding frequency derived from a reference sampling frequency applicable to the first subset of subscriber lines.

14 Claims, 5 Drawing Sheets

(51) Int. Cl.
H04M 11/06 (2006.01)
H04M 3/26 (2006.01)
H04M 3/30 (2006.01)

(58) Field of Classification Search
USPC .......................................................... 370/201
See application file for complete search history.

(56) References Cited

U.S. PATENT DOCUMENTS

2016/0105215 A1* 4/2016 Wang .................. H04B 3/32
370/201
2019/0007097 A1* 1/2019 Tu ............................ H04B 3/32

OTHER PUBLICATIONS

Huberman et al (Interference Alignment for DSL, IEEE, 2012) (Year: 2012).*
"On vectoring with mixed order Fourier transforms" ITU—Telecommunications Standardization Sector, Nov. 2015.
"G.fast: On vector groups with multiple sampling frequencies" ITU—Telecommunications Standardization Sector, Apr. 2016.
Sandra Drakulic et al., "Coexistence Analysis of Asynchronous Digital Subscribe Lines with Different Sampling Rate and Carrier Frequency Spacing," 2014 IEEE Global Communications Corference, Dec. 2014, pp. 2234-2239.
Martin Wolkerstorfer et al., "Maintaining Harmony in the Vectoring xDSL Family by Spectral Coordinatio," 2015 49th Asilomar Conference on Signals, Systems and Computers, IEEE, Nov. 2018, pp. 1739-1743.
"Very high speed digital subscriber line transceivers 2 (VDSL2)," Series G: Transmission Systems and Media, Digital Systems and Networks, International Telecommunication Union, ITU-T G.993.2, pp. 1-366.
International Search Report PCT/ISA/210 for International Application No. PCT/EP2017/063013 dated Jul. 6, 2017.

* cited by examiner

CROSSTALK MITIGATION FOR OUT-OF-BAND TONES

CROSS-REFERENCE TO RELATED APPLICATIONS

This application is a national phase under 35 U.S.C. § 371 of PCT International Application No. PCT/EP2017/063013 which has an International filing date of May 30, 2017, which claims priority to European Application No. 16305678.1, filed Jun. 9, 2016, the entire contents of each of which are hereby incorporated by reference.

TECHNICAL FIELD OF THE INVENTION

The present invention relates to crosstalk mitigation within a wired Discrete Multi Tone (DMT) communication system.

TECHNICAL BACKGROUND OF THE INVENTION

Crosstalk (or inter-channel interference) is a major source of channel impairment for wired communication systems, such as Digital subscriber Line (xDSL) communication systems.

As the demand for higher data rates increases, systems are evolving toward higher frequency bands, wherein crosstalk between neighboring transmission lines (that is to say transmission lines that are in close vicinity over part or whole of their length, such as twisted copper pairs in a cable binder) is more pronounced (the higher frequency, the more coupling).

For instance, in the recommendation entitled "*Very High Speed Digital subscriber Line Transceivers 2*", ref. G.993.2, and adopted by the International Telecommunication union (ITU) in April 2010 (VDSL2 hereinafter), the transmit spectrum has been broadened from 2,208 MHz (ADSL2+) up to 17,664 MHz with transmit profile 17a and 4,3125 kHz tone spacing. In G.9701 ITU recommendation (G.fast hereinafter), the transmit spectrum goes up to 105,93225 MHz with transmit profiles 106a or 106b and 51.75 kHz tone spacing.

Different strategies have been developed to mitigate crosstalk and to maximize effective throughput, reach and line stability. These techniques are gradually evolving from static or dynamic spectrum management techniques to multi-user signal coordination a.k.a. vectoring.

One vectoring technique for mitigating crosstalk is signal precoding: the user data symbols are jointly passed through a precoder before being transmitted over the respective communication channels. The precoder is such that the concatenation of the precoder and the communication channels results in little or no inter-channel interference at the receivers.

A further vectoring technique for mitigating crosstalk is signal postcoding (or post-processing): the receive data symbols are jointly passed through a postcoder (a.k.a. crosstalk cancellation filter) before being detected. The postcoder is such that the concatenation of the communication channels and the postcoder results in little or no inter-channel interference at the detectors.

Signal vectoring is typically performed at a traffic aggregation point as multi-user signal coordination between co-located transceivers is required: signal precoding is particularly appropriate for downstream communication (i.e., toward customer premises), while signal postcoding is particularly appropriate for upstream communication (i.e., from customer premises).

More formally, an N×N Multiple Input Multiple output (MIMO) channel can be described by the following linear model:

$$y_k = H_k x_k + z_k \quad (1),$$

wherein the N-component complex vector $x_k$, respectively $y_k$, is a discrete frequency representation, as a function of the frequency index k, of the symbols transmitted over, respectively received from, the N vectored channels, wherein the N×N complex matrix $H_k$ is the channel matrix: the (i,j)-th component $H_{i,j}$ of the channel matrix $H_k$ describes how the communication system produces a signal on the i-th channel output in response to a signal being fed to the j-th channel input; the diagonal elements of the channel matrix describe direct channel coupling, and the off-diagonal elements of the channel matrix (also referred to as the crosstalk coefficients) describe inter-channel coupling, and wherein the N-component complex vector $z_k$ denotes additive noise over the N channels, such as Radio Frequency Interference (RFI) or thermal noise.

Signal precoding and postcoding are advantageously implemented by means of matrix products.

In downstream, a linear precoder performs a matrix-product in the frequency domain of a data vector $u_k$ with a precoding matrix $P_k$ before actual transmission over the respective communication channels, i.e. actual transmit vector is $x_k = P_k u_k$.

In upstream, a linear postcoder performs a matrix-product in the frequency domain of the receive vector $y_k$ with a postcoding matrix $Q_k$ to recover the data vector $u_k$ (after channel equalization and power normalization), i.e. detection is performed on $y'_k = Q_k y_k$.

In order to leverage on the expected vectoring gains, the ITU has recently proposed a new VDSL2 transmit profile to provide even higher data rates on short loops. VDSL2 35b transmit profile (a.k.a. vplus) extends 17a transmit profile up to 35,328 MHz while sticking to the same 4,3125 kHz tone spacing, thus doubling the number of available tones from 4096 to 8192. A similar extended transmit profile 212a, which extends 106a/b transmit profile from 105,93225 MHz up to 211,8645 MHz, has been defined for G.fast.

Consequently, one may expect that both VDSL2 17a and 35b transmit profiles will coexist over the same copper plant, and so probably will G.fast 106a/b and 212a transmit profiles. The co-existence of different transmit profiles within a common loop plant may bring about some additional crosstalk that ultimately translates into lower-than-expected data rates.

Indeed, the sampling frequency is typically configured as twice the upper bound of the broadest supported transmit profile (as dictated by Nyquist Shannon theorem). Presently, legacy equipment supporting 17a transmit profile are likely to use 35,328 MHz as sampling frequency for synthesizing the transmit outgoing signal from the IFFT samples or for sampling the receive incoming signal, while equipment supporting new 35b transmit profile are likely to use 70,656 MHz as sampling frequency.

This additional crosstalk is twofold. A first source of crosstalk is caused by the synthesis of the transmit analog signal over the legacy 17a lines with 35,328 MHz as sampling frequency: part of the original transmit spectrum is mirrored with respect to the shannon frequency (aka folding frequency, i.e. half the sampling frequency) into the first alias band spanning from 17,664 MHz up to 35,328 MHz, which mirrored signal then interfering with the useful communication signals on the 35b lines. A second source of crosstalk is caused by the sampling of the receive analog signal over the legacy 17a lines with 35,328 MHz as sampling frequency: communications over the 35b lines causes crosstalk in the first alias band of the legacy 17a lines, and these crosstalk signals are then mirrored back into the 17a communication band after signal sampling. This additional crosstalk can be partly mitigated by the use of appropriate transmit smoothing filters and receive anti-alias filters. Even then, and due to imperfect filtering (cheap low-order filters are typically used at subscriber side), the impairment is still particularly significant for the upper tones nearby the folding frequency, and may completely annihilate the expected vectoring gains for those tones.

This issue has been acknowledged by British Telecom for mixed VDSL2 17a/35b deployments in the contribution entitled "*On vectoring with mixed order Fourier transforms*" published by the ITU in November 2015 with ref. 2015-11-Q4-049R1, and for mixed G.fast 106a/212a deployments in the contribution entitled "*G. fast: On vector groups with multiple sampling frequencies*" published by the ITU in April 2016 with ref. 2016-04-Q4-042.

Figure 1:
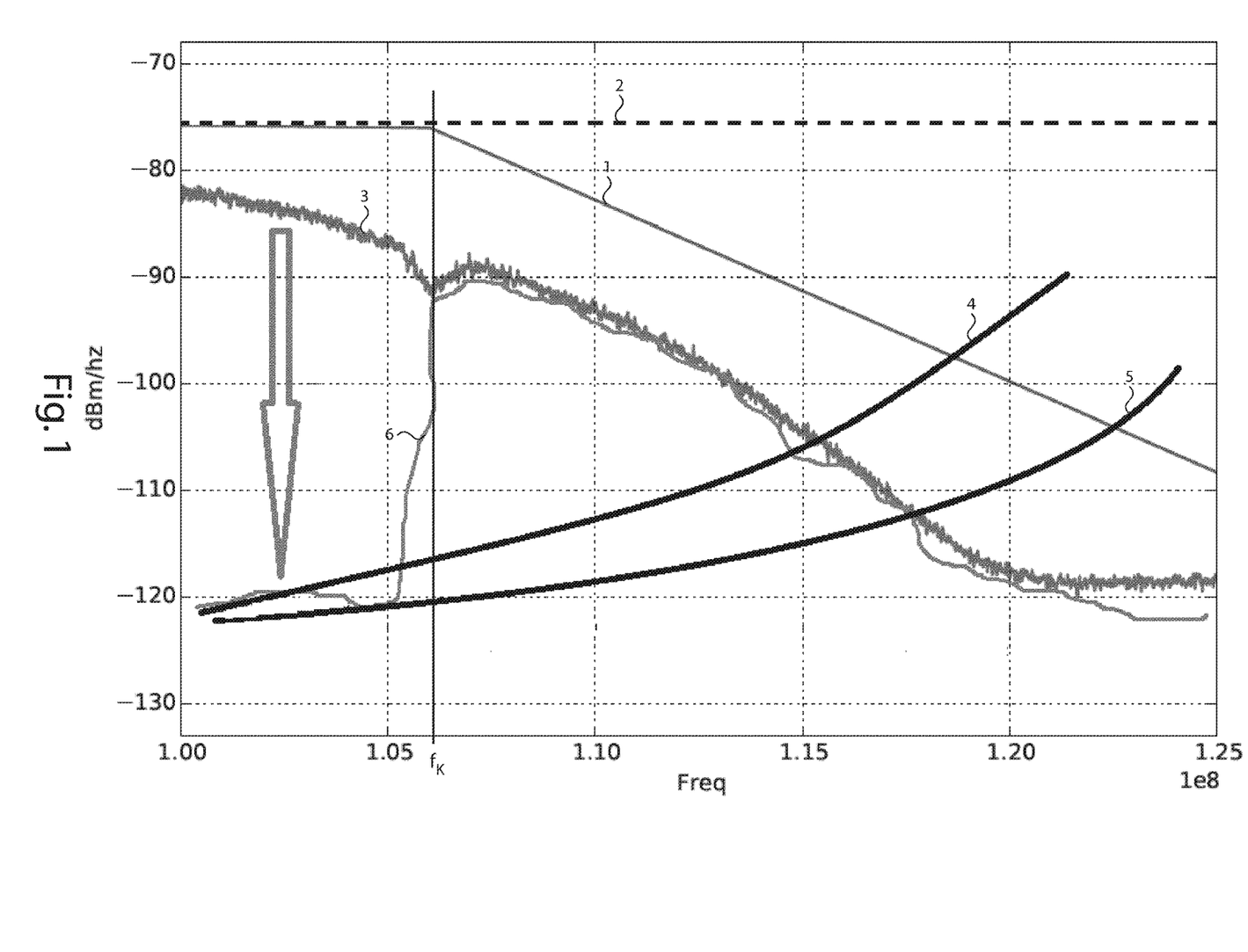
FIG. 1 illustrates signal waveforms showing crosstalk in the conventional art.

There is seen in FIG. 1 two plots 1 and 2 in logarithmic scale of the applicable transmit Power Spectral Density (PSD) masks over a 106a and 212a line respectively around the folding frequency $f_K$=105,93225 MHz. The actual transmit signal PSD over the 106a line has been depicted as plot 3. As one can notice, the alias transmit signal above 106 MHz starts being filtered. The 'virtual' transmit noise floors 4 and 5 are depicted for two typical loop lengths (receive background noise times the inverse of the direct path loss). The difference between the curves 3 and 4 or 3 and 5 (plus some noise margin) represents the possible vectoring gains over the 106a line (see arrow in FIG. 1).

As one can see a substantial amount of the alias signal over the 106a line just above the folding frequency $f_K$ can leak into the 212a line and affect the upper tones nearby the folding frequency. As an illustration, the expected alias crosstalk for the 212a line has been depicted as plot 6 in FIG. 1. This alias crosstalk adds up to the background noise floor 3 or 4, and could possibly annihilate all possible vectoring gains over the corresponding tones. Likewise, a substantial amount of the transmit signal over the 212a lines above the folding frequency $f_K$ can leak into the 106a lines, be aliased back and affect the lower tones nearby the folding frequency $f_K$ (not shown).

As a first partial solution to this problem, one could re-connect all legacy 17a lines to 35b-capable transceivers at the access node, meaning that downstream transmit and upstream receive 17a signals would be over-sampled at 70,656 MHz. Yet, upstream communications over the 35b lines would still suffer from the alias interference caused by non-oversampled 17a customer Premises Equipment (CPE). Also, such a line re-dispatching would cause service disruption, and would substantially increase the CAPital and OPerational EXpenditures (CAPEX and OPEX) on account of the necessary equipment upgrade and deployment of maintenance staff on the field.

Another way to solve this problems is to switch off some tones above and nearby 17,664 MHz for the 35b lines such that they cannot get affected and such that they don't affect lower tones on 17a lines. However, this solution results in substantial data rate loss.

Some proposals have been made to cancel this additional crosstalk in the vectoring Processor (VP). Current VPs are typically fed with frequency samples in increasing tone order, which means that you need a buffer for each line to remember all tones data below the folding frequency till the tone data above the folding frequency start being fed to the VP. Not only such a solution requires large buffer memory in the VP, which induces a substantial additional cost for the VP, but it also introduces large latency in the data path.

SUMMARY OF THE INVENTION

It is an object of the present invention to efficiently mitigate that additional crosstalk in case of mix deployments.

In accordance with a first aspect of the invention, a method is proposed for jointly processing DMT communication signals making use of a common tone spacing and to be transmitted over, respectively received from, a plurality of subscriber lines. DMT communications over a first subset of the plurality of subscriber lines are confined within a first transmit spectrum, and DMT communications over a second disjoint subset of the plurality of subscriber lines are confined within a second extended transmit spectrum that is a frequency extension of the first transmit spectrum. The method comprises inputting first groups of frequency samples to be transmitted over, respectively received from, the first and second subsets of subscriber lines at respective first tones and following a first group selection order, alternated with second mirrored groups of frequency samples to be transmitted over, respectively received from, the second subset of subscriber lines at respective second mirrored tones of the first tones, and following a second mirrored group selection order of the first group selection order, to a vectoring processor for joint mitigation of first crosstalk present over the first and second subsets of subscriber lines at the respective first tones and second crosstalk present over the second subset of subscriber lines at the respective second tones. The first tones are common to the first and second transmit spectra. Mirroring is with respect to a folding frequency derived from a reference sampling frequency applicable to the first subset of subscriber lines.

In one embodiment of the invention, the first tones span from a first given tone up to the folding frequency, and the second tones span from the folding frequency up to a second given mirrored tone of the first given tone.

In one embodiment of the invention, the first and second groups of frequency samples individually comprise an equal number of consecutive frequency samples greater than or equal to one.

In one embodiment of the invention, the first group selection order corresponds to groups with increasing tone index and the second mirrored group selection order corresponds to groups with decreasing tone index. Alternatively, the first group selection order corresponds to groups with decreasing tone index and the second mirrored group selection order corresponds to groups with increasing tone index.

In one embodiment of the invention, the first crosstalk comprises first nominal crosstalk caused by DMT communication signals transmitted at the first tones over the first and second subsets of subscriber lines and that linearly interfere with respective ones of the first and second subsets of subscriber lines, and further first aliased crosstalk caused by DMT communication signals transmitted at the second tones over the second subset of subscriber lines, and that linearly interfere with respective ones of the first subset of subscriber lines, and that is backward-folded over the first mirrored tones on account of signal sampling over the first subset of subscriber lines at the reference sampling frequency.

In a further embodiment of the invention, the second crosstalk comprises second nominal crosstalk caused by DMT communication signals transmitted at the second tones over the second subset of subscriber lines, and that linearly interfere with respective ones of the second subset of subscriber lines, and further second aliased crosstalk caused by DMT communication signals transmitted at the first tones over the first subset of subscriber lines that is forward-folded over the second mirrored tones on account of signal synthesis over the first subset of subscriber lines at the reference sampling frequency, and that linearly interfere into respective ones of the second subset of subscriber lines.

In one embodiment of the invention, the method further comprises assigning first pilot sequences to respective transceivers coupled to the first and second subsets of subscriber lines for modulation of first pilot signals to be transmitted at the first tones, assigning second pilot sequences to respective transceivers coupled to the second subsets of subscriber lines for modulation of second pilot signals to be transmitted at the second tones. The first and second pilot sequences are mutually orthogonal between each other.

In a further embodiment, the method further comprises selecting the first pilot sequences from a first subset of a plurality of mutually orthogonal pilot sequences, and selecting the second pilot sequences from a second disjoint subset of the plurality of mutually orthogonal pilot sequences.

In a further embodiment of the invention, the method further comprises transmitting the second pilot signals at the second tones over the second subset of subscriber lines, measuring first induced interference at the first mirrored tones over the first subset of subscriber lines, characterizing the first aliased crosstalk from the measured first interference and the transmitted second pilot signals.

In a further embodiment of the invention, the method further comprises transmitting the first pilot signals at the first tones over the first and second subsets of subscriber lines, measuring second induced interference at the second mirrored tones over the second subset of subscriber lines, and characterizing the second aliased crosstalk from the measured second interference and the transmitted first pilot signals.

In accordance with another aspect of the invention, a processor is proposed for digitally processing DMT communication signals to be transmitted over, respectively received from, at least one subscriber line of a plurality of subscriber lines. The processor is configured to input first groups of frequency samples to be transmitted over, respectively received from, the at least one subscriber line at respective first tones and following a first group selection order, alternated with second mirrored groups of frequency samples to be transmitted over, respectively received from, the at least one subscriber line at respective second mirrored tones of the first tones, and following a second mirrored group selection order of the first group selection order, to a vectoring processor for joint mitigation of first crosstalk present over the at least one subscriber line at the respective first tones and second crosstalk present over the at least one subscriber lines at the respective second tones. The first tones are common to a first transmit spectrum used over a first subset of the plurality of subscriber lines and to a second extended transmit spectrum used over a second disjoint subset of the plurality of subscriber lines and that is a frequency extension of the first transmit spectrum. The second subset comprises the at least one subscriber line. Mirroring is with respect to a folding frequency derived from a reference sampling frequency applicable to the first subset of subscriber lines.

Embodiments of a processors according to the invention correspond with the embodiments of a method according to the invention.

The processor is typically embodied as a communication chipset for digitally encoding and decoding broadband communication signals conveyed over one or more subscriber lines, and typically forms part, together with the vectoring processor, of an access node providing broadband communication services to subscribers over a copper plant, and deployed from a central office (co) or from a remote location closer to subscriber premises (street cabinet, pole cabinet, etc). Examples of such an access node are a Digital subscriber Line Access Multiplexer (DSLAM) supporting vectored VDSL2 17a/35b communications, or a Distribution Point Unit (DPU) supporting G.fast 106a/b/212a communications.

In order to mitigate the alias crosstalk without the need for large memory buffer in the VP, it is proposed to input the VP with alternate groups of frequency samples: each group of frequency samples within the legacy portion of the 35b band ranging from 0 up to 17,664 MHz is supplied along with its respective mirrored group of frequency samples in the extended portion of the 35b band ranging from 17,664 MHz up to 35,328 MHz. Mirroring herein is with respect to the assumed folding frequency, namely 4096×4,3125 kHz=17, 664 MHz for legacy 17a lines.

The groups typically comprises a relatively low and equal number of frequency samples. This number is typically determined based on the DSP specifics, and possibly on the encoding and encapsulation scheme used over the interface towards the VP. Yet, the bigger the groups, the more buffering and latency in the VP.

Minimal buffering and latency is achieved by alternating the lower tones and the upper mirrored tones on a per tone basis, meaning the groups individually comprise one single frequency sample.

The proposed input scheme can be restricted to tones in the neighborhood of the folding frequency for which the aliased crosstalk is expected to be a major impairment, for instance about 20% of the legacy and extended portions of the 35b band.

The present invention is particularly advantageous in that all the necessary frequency samples are readily available at the VP with minimal buffering and latency for joint mitigation of both the nominal crosstalk and aliased crosstalk at both the lower tones and the upper mirrored tones.

In order to characterize the respective alias crosstalk channels for good vectoring performance, interference measurements need to be performed between tones in the legacy 17a band or in the legacy portion of the 35b band on one side, and tones in the extended portion of the 35b band on the other side: pilot signals are transmitted over the lower tones while interference measurements are performed over the mirrored upper tones; and the way around, pilot signals are transmitted over the upper tones while interference measurements are performed over the lower mirrored tones.

Also, in order to differentiate between the different crosstalk contributions, not only shall the pilot sequences used over the respective disturber lines be mutually orthogonal, but also the pilot sequences used over the lower tones shall be orthogonal with the pilot sequences used over the upper tones. In particular, this is the case if the lower and upper tones are assigned different pilot sequences selected from a larger set of mutually orthogonal pilot sequences.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 2:
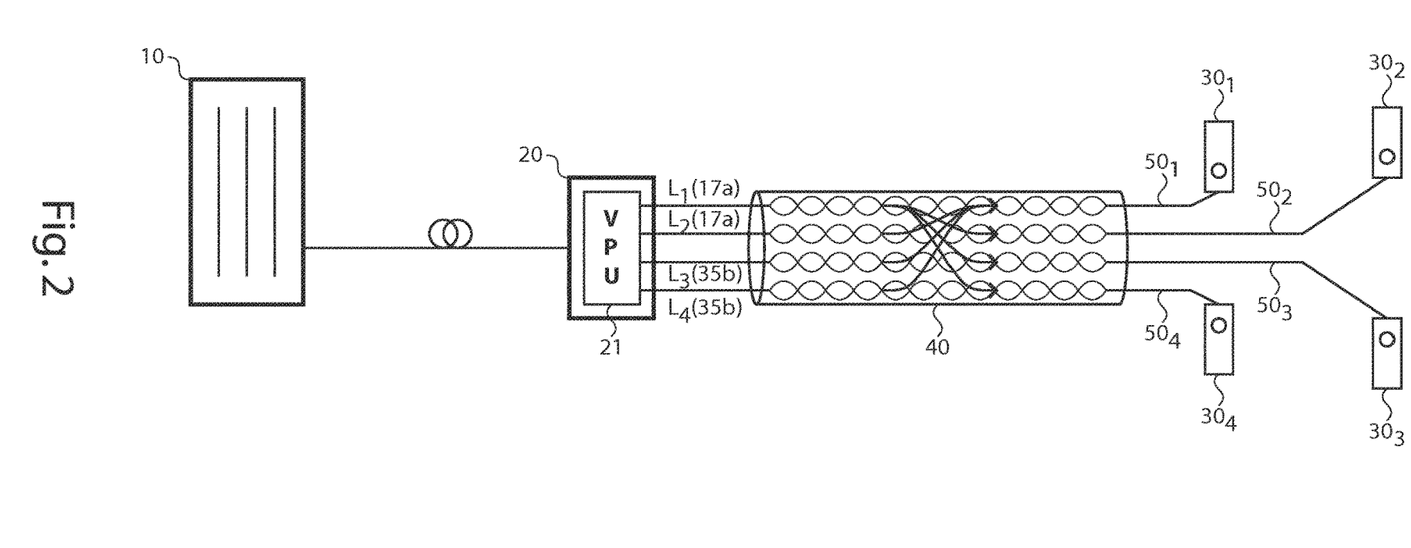
FIG. 2 represents an overview of an access plant.

There is seen in FIG. 2 an access plant comprising a network unit 10 at a co, an access node 20 coupled via one or more optical fibers to the network unit 10, and further coupled via a copper plant to customer Premises Equipment (CPE) 30 at various subscriber locations. The transmission media of the copper plant is typically composed of copper Unshielded Twisted Pairs (UTP).

As an illustrative example, the copper plant comprises four subscriber lines $L_1$ to $L_4$ sharing a common access segment 40, and then going through dedicated loop segments 50 for final connection to CPEs 301 to 304 respectively.

Within the common access segment 40, the subscriber lines $L_1$ to $L_4$ are in close vicinity and thus induce crosstalk into each other (see the arrows in FIG. 1 between the respective subscriber lines).

The access node 20 comprises a vectoring Processing unit 21 (or VPU) for jointly processing the data symbols that are being transmitted over, or received from, the copper plant in order to mitigate the crosstalk and to increase the achievable data rates.

It is further assumed that both 17a and 35b VDSL2 transmit profiles are simultaneously used over the copper pant. More specifically and as an illustrative example, the subscriber lines $L_1$ and $L_2$ are assumed to use legacy 17a transmit profile, and the subscriber lines $L_3$ and $L_4$ are assumed to use extended 35b transmit profile. The legacy CPEs 301 and 302, respectively the new CPEs 303 and 304, are expected to use 35,328 MHz, respectively 70,656 MHz, as sampling frequency for synthesizing the upstream transmit signals and for sampling the downstream receive signals.

Figure 3:
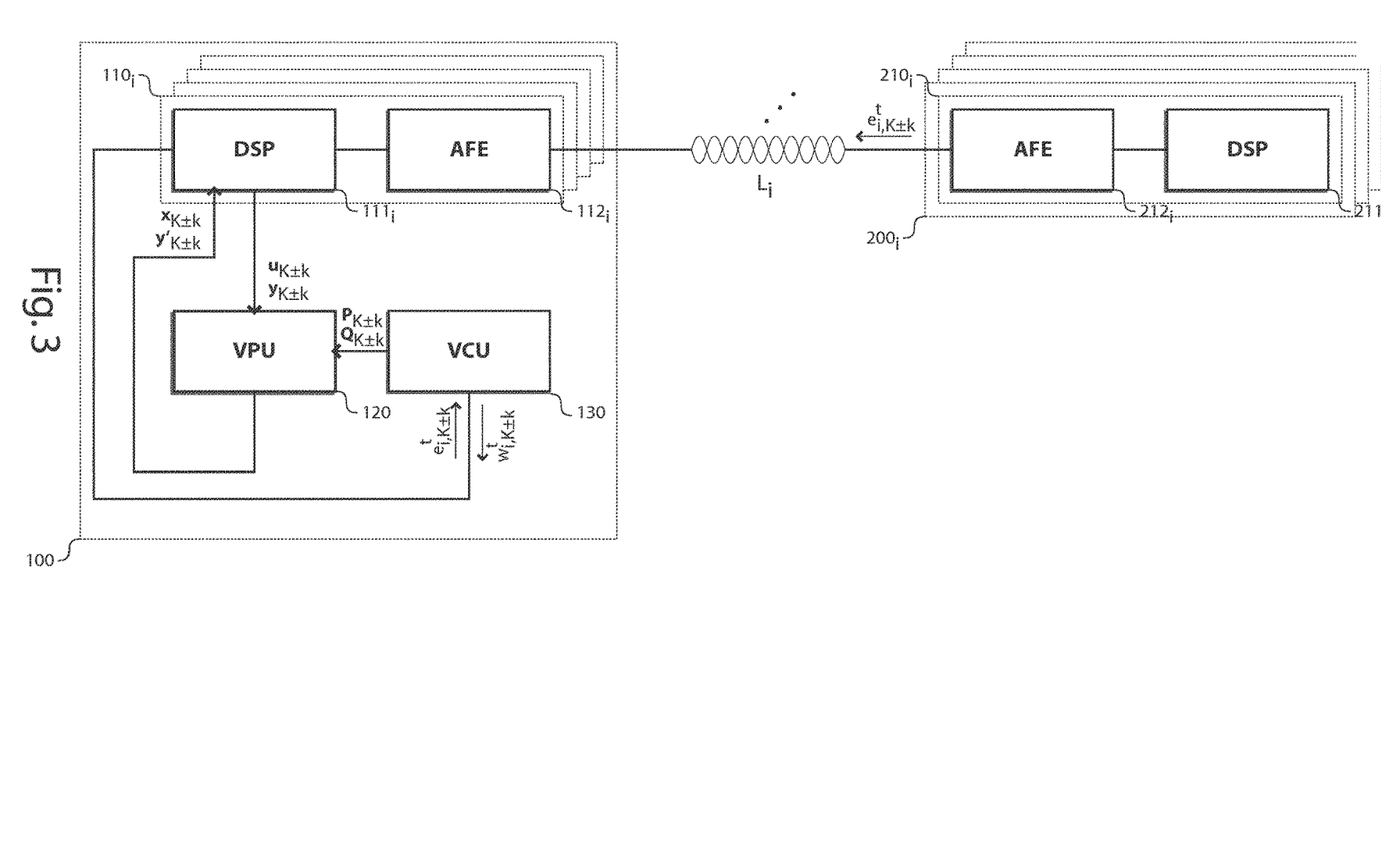
FIG. 3 represents further details about an access node and subscriber equipment.

There is seen in FIG. 3 further details about an access node 100 and respective CPEs 200.

The access node 100 comprises:
transceivers 110;
a Vectoring Processing Unit (VPU) 120; and
a Vectoring Control Unit (VCU) 130 for controlling the operation of the VPU 120.

The transceivers 110 are individually coupled to the VPU 120 and to the VCU 130. The VCU 130 is further coupled to the VPU 120.

The transceivers 110 individually comprise:
a Digital Signal Processor (DSP) 111; and
an Analog Front End (AFE) 112.

The transceivers 110 are coupled to respective transceivers 210 within the CPEs 200 through respective subscriber lines $L_1$ to $L_N$, which are assumed to form part of the same vectoring group.

The transceivers 210 individually comprise:
a Digital Signal Processor (DSP) 211; and
an Analog Front End (AFE) 212.

The AFEs 112 and 212 individually comprise a Digital-to-Analog Converter (DAC) and an Analog-to-Digital Converter (ADC) tuned on their respective sampling frequency, a transmit filter and a receive filter for confining the signal energy within the appropriate communication frequency bands while rejecting out-of-band and aliasing interference, a line driver for amplifying the transmit signal and for driving the transmission line, and a Low Noise Amplifier (LNA) for amplifying the receive signal with as little noise as possible.

VDSL2 communication makes use of Frequency Division Duplexing (FDD) where downstream and upstream communications operate simultaneously over the same transmission medium in distinct and non-overlapping frequency bands. Hence the AFEs 112 and 212 further comprise a hybrid for coupling the transmitter output to the transmission medium and the transmission medium to the receiver input while achieving low transmitter-receiver coupling ratio. The AFE may further accommodate echo cancellation filters to reduce the coupling ratio at a further extent.

The AFEs 112 and 212 further comprise impedance-matching circuitry for adapting to the characteristic impedance of the transmission medium, clipping circuitry for clipping any voltage or current surge occurring over the transmission medium, and isolation circuitry (typically a transformer) for DC-isolating the transceiver from the transmission medium.

The DSPs 111 and 211 are configured to operate downstream and upstream communication channels for conveying user traffic over the subscriber lines $L_1$ to $L_N$.

The DSPs 111 and 211 are further configured to operate downstream and upstream control channels, such as the special Operation channel (SOC) or the Embedded operation channel (EOC), that are used to transport control traffic, such as configuration, management or diagnosis commands and responses. Control traffic payload can also be conveyed over typical Ethernet frames with specific source and/or destination MAC addresses. Control traffic is multiplexed with user traffic over the transmission medium.

More specifically, the DSPs 111 and 211 are for encoding and modulating user and control data into DMT symbols, and for de-modulating and decoding user and control data from DMT symbols.

The following transmit steps are typically performed within the DSPs 111 and 211:
data encoding, such as data multiplexing, framing, scrambling, error correction encoding and interleaving;
signal modulation, comprising the steps of ordering the tones according to a tone ordering table, parsing the encoded bit stream according to the respective bit loadings of the ordered tones, and mapping each chunk of bits onto an appropriate transmit constellation point (with respective carrier amplitude and phase), possibly with Trellis coding;
signal scaling, such as power normalization, transmit PSD shaping and transmit fine-gain scaling;
Inverse Fast Fourier Transform (IFFT);
Cyclic Prefix (CP) insertion; and
time-windowing.

The following receive steps are typically performed within the DSPs 111 and 211:
time-windowing and CP removal;
Fast Fourier Transform (FFT);
Frequency EQualization (FEQ);

signal de-modulation and detection, comprising the steps of applying to each and every equalized frequency sample an appropriate constellation grid, the pattern of which depends on the respective bit loading, detecting the expected transmit constellation point and the corresponding transmit bit sequence, possibly with Trellis decoding, and re-ordering all the detected chunks of bits according to the tone ordering table; and data decoding, such as data de-interleaving, error correction decoding, de-scrambling, frame delineation and de-multiplexing.

The DSPs 111 are further configured to supply data frequency samples to the VPU 120 before Inverse Fast Fourier Transform (IFFT) for joint signal precoding, and to supply receive frequency samples to the VPU 120 after Fast Fourier Transform (FFT) for joint signal post-processing. The DSPs 111 are coupled to the VPU 120 through a common data bus or via one or more dedicated links.

The DSPs 111 are further configured to receive pre-compensated transmit samples from the VPU 120 for further transmission, and to receive post-compensated receive samples from the VPU 120 for further detection. Alternatively, the DSPs 111 may receive correction samples to add to the initial frequency samples before further transmission or detection.

The VPU 120 is configured to mitigate the crosstalk induced over the subscriber lines. The VPU 120 comprises a linear precoder configured to multiply a vector of data frequency samples with a precoding matrix in order to pre-compensate an estimate of the expected crosstalk, and a linear postcoder configured to multiply a vector of receive frequency samples with a postcoding matrix so as to post-compensate an estimate of the incurred crosstalk.

In the precoding or postcoding matrix, a row is associated with a particular victim line, while a column is associated with a particular disturber line.

In order to account for the additional alias crosstalk, the channel model (1) and corresponding notations need to be slightly modified.

Let M denote the number of lines that use new 35b transmit profile among the N vectored lines, implying that N-M lines are legacy 17a lines. Let K denotes the maximum tone index used over the legacy lines 17a, namely K=4096, meaning that the reference sampling frequency over the legacy 17a lines can be written as $f_s=2K\Delta f$ with $\Delta f$ being the common tone spacing used over both the 17a and 35b lines. Thus the tone index k ranges from 0 to K-1 over the legacy 17a lines, and from 0 to 2K-1 over the new 35b lines which use a double amount of tones.

The MIMO channel matrix HK±k (with k ranging from 1 to K-1) now comprises $(N+M)^2$ complex coupling coefficients, of which:

$N^2$ elements Hi, j, K-k, K-k describe linear crosstalk coupling between the N lines at tone K-k;

$M^2$ elements Hi, j, K+k, K+k describe linear crosstalk coupling between the M lines at frequency K+k;

NM elements Hi, j, K-k, K+k describe alias crosstalk coupling from the new 35b lines at frequency K+k towards the legacy 17b lines at frequency K-k; and NM elements Hi, j, K+k, K-k describe alias crosstalk coupling from the legacy lines at frequency K-k towards the new 35b lines at frequency K+k.

Some of these channel coefficients are close to zero as there are no such expected interference terms. For instance, $M^2$ elements should be close to zero among the NM channel coefficients Hi, j, K-k, K+k, as there is no alias crosstalk expected within and between the new 35b lines, at least if the crosstalk couplings are not too strong, and so should be $M^2$ elements among the further NM channel coefficients Hi, j, K+k, K-k.

The precoding matrix PK±k and postcoding matrix QK±k are similarly extended as per the channel matrix HK±k from dimension N to N+M with respective coefficients Pi, j, K±k, K±k and Qi, j, K±k, K±k.

Likewise, if e.g. first-order inversion is used for computing the precoding matrix PK±k or postcoding matrix QK±k, then $M^2$ elements are also expected to be close to zero among the NM precoding or postcoding coefficients Pi, j, K-k, K+k or Qi, j, K-k, K+k, and so are $M^2$ elements among the further NM precoding or postcoding coefficients Pi, j, K+k, K-k. or Qi, j, K+k, K-k. The corresponding pre or post-compensation of the alias crosstalk within and between the new 35b lines can thus be harmlessly disabled.

The data vector uK±k now comprises N+M data frequency samples, of which N samples ui, K-k are data frequency samples to be transmitted over the legacy 17a and new 35b lines at frequency K-k, and M samples are frequency data samples to be transmitted over the new 35b lines at frequency K+k. And so does the transmit vector xK±k, the receive vector yK±k and the postcoded receive vector y'K±k, which now all comprise N+M transmit frequency samples.

The VPU 120 is configured to be input with tone data at tone K-k together with tone data at mirrored tone K+k, namely with the so-called vector uK±k or yK±k, to mitigate the linear crosstalk and alias crosstalk both at tone K-k and at mirrored tone K+k at once, and to return pre or post-compensated tone data at tone K-k and at mirrored tone K+k to the DSPs 111, namely the so-called vector xK±k or y'K±k.

The frequency samples in the legacy range from 0 to K-1 are supplied to the VPU 120 in a given order and, for the extended 35b lines, the frequency samples in the extended range from K to 2K-1 are supplied to the VPU 120 in a mirrored version of the order used over the legacy range. Also, in order to reduce the buffering requirements in the VPU 120, the tone data in the legacy range from 0 to K-1 are supplied alternatively on a per tone or group of tones basis with the respective mirrored tone data in the extended range from K to 2K-1. Mirroring herein is versus the folding frequency index K.

For instance, if a subscriber line Li is operated with 17a transmit profile, then the corresponding DSP supplies the tone data in the legacy tone range from 0 to K-1 in increasing tone order, namely { . . . , ui, k, ui, k+1, ui, k+2, . . . }. If the subscriber line Li is operated with 35b transmit profile, then the corresponding DSP supplies tone data in the legacy range from 0 to K-1 in increasing tone order alternated with mirrored tone data in the extended range from K to 2K-1 in decreasing tone order, namely { . . . , ui, K-k, . . . , ui, K-k+L-1, ui, K+k, . . . , ui, K+k-L+1, ui, K-k+L, . . . , ui, K-k+2L-1, ui, K+k-L, . . . , ui, K+k-2L+1, . . . }, wherein L≥1 denotes the size of the individual groups of consecutive tones in either range.

Thus each tone group Gl={ui, K-k+lL, . . . , ui, K-k+(l+1)L-1} in the lower range from 0 to K-1 is accompanied by its respective mirrored tone group Gl*={ui, K+k-lL, . . . , ui, K+k-(l+1)L+1} in the upper range from K to 2K-1. The index l herein denotes a group index ranging from 0 to K/L, assuming K is a multiple of the group size L. The lower the group size, the lower the buffering and latency in the VPU 120. So only low values are expected for L, typically 1, 2, 4 or 8 or any other low value.

Of course, any arbitrary order could be used as well for inputting the tones, namely Gl={ . . . , ui, K-k$_1$(l), ui, K−$k_2$(l), ui, K−$k_L$(l), . . . } accompanied by Gl*={ . . . , ui, K+$k_1$(l), ui, K+$k_2$(l), ui, K+$k_L$(l), . . . }, wherein the indexes $k_1$(l), $k_2$(l), . . . , $k_L$(l) span all applicable tones in the legacy range from 0 to K−1 through successive l.

Also, the exact transmission order within each tone group is irrelevant, but one has to make sure that a frequency sample in the lower range and the corresponding mirrored frequency sample in the upper range are not separated from each other more than a given number of frequency samples.

Some synchronization between the various DSPs 111 is required to achieve the full benefits of the present invention: the DSPs 111 input tone data to the VPU 120 starting simultaneously from the same tone index while following the same tone selection order. To that end, timing information and/or clock signals can be exchanged between the VPU 120 and the various DSPs 111.

The proposed input scheme can be restricted to tones in the neighborhood of the folding frequency, e.g. about 20% of the legacy and extended portions of the 35b band. For instance, the lower tone data are first fed in increasing tone order without their respective mirrored counterparts, and up to a given tone index K−$k_1$. From that tone index onwards, the tone data and their respective mirrored counterparts versus the folding frequency are fed alternatively to the VPU 120. And next, the upper tones data from the tone index K+$k_1$+1 onwards are fed in increasing tone order, and again without their respective mirrored counterparts, which has been already supplied.

Alternatively, one can stick to the proposed input scheme across all the tones, yet the 2 NM precoding or postcoding coefficients corresponding to the mitigation of the alias crosstalk are set to zero outside the neighborhood of the folding frequency, meaning there will be no joint but separate processing of the lower and upper mirrored tones at those frequencies.

The VCU 130 is basically for controlling the operation of the VPU 120, and more specifically for estimating the crosstalk coefficients between the subscriber lines of the vectoring group, and for initializing and updating the coefficients of the precoding matrix PK±k or postcoding matrix QK±k from the so-estimated crosstalk coefficients.

The various channel couplings are estimated based on pilot (or probing) signals transmitted during the so-called SYNC symbols. The SYNC symbols occur periodically after every super frame, and are transmitted synchronously over all the vectored lines (super frame alignment).

On a given disturber line, a subset of the tones of a SYNC symbol (pilot tones hereinafter) are all 4-QAM modulated by the same pilot digit from a given pilot sequence, and transmit one of two complex constellation points, either '1+j' corresponding to '+1' or '−1−j' corresponding to '−1'. Some further scrambling is typically performed for randomization of the constellation points of the SYNC symbols.

On a given victim line, both the real and imaginary part of the normalized slicer error, which is the difference vector between the received and properly equalized frequency sample and the constellation point onto which this frequency sample is demapped, are measured on a per pilot tone basis and reported (possibly with some frequency decimation) to the VCU 130 for estimation of the various channel couplings.

The successive error samples gathered over a given victim line are next correlated with the pilot sequence used over a given disturber line in order to obtain an estimate of the channel coupling from the given disturber line into the given victim line.

To reject the crosstalk contributions from the other disturber lines, the pilot sequences used over the respective disturber lines are mutually orthogonal (e.g., walsh-Hadamard sequences).

More specifically, the VCU 130 starts first by configuring the transceivers 110 and 210 with the respective pilot sequences to use for modulation of the pilot tones of the SYNC symbols. The pilot sequences comprises T pilot digits using {+1, −1} as alphabet. The pilot digit that modulates a given tone k during SYNC symbol position t over line Li is denoted as $w_{i,k}^t$.

In order to differentiate between the different sources of interference, not only shall the pilot sequence $\{w_{i,K-k}^t\}_{t=t_0 \ldots t_0+T-1}$ used over tone K−k and line Li be orthogonal to the pilot sequences $\{w_{j \neq i,K-k}^t\}_{t=t_0 \ldots t_0+T-1}$ used over tone K−k and other lines Lj≠i, but it shall also be orthogonal to the pilot sequences $\{w_{j \neq i,K+k}^t\}_{t=t_0 \ldots t_0+T-1}$ used over mirrored tone K+k and other lines Lj≠i or same line Li.

This can be achieved by assigning pilot sequences from a set of N+M mutually orthogonal pilot sequences: N pilot sequences being assigned to the N 17a and 35b lines for modulation of the lower tones in the legacy range from 0 to K−1, and M distinct pilot sequences being assigned to the M 35b lines for modulation of the upper tones in the extended range from K to 2K−1.

As a consequence, the required length T of the pilot sequences, which shall be greater than or equal to the number N+M of mutually orthogonal sequences, is increased, and so is the minimum crosstalk acquisition time. Yet, Frequency Dependent Pilot Sequences (FDPS) or targeted estimation can be used to reduce the length of the pilot sequences and the crosstalk acquisition time.

The VCU 130 next gathers error samples as measured by the transceivers 110 and 210 while the pilot symbols are being transmitted. The error sample as measured by the transceiver 110i or 210i over a victim line Li at tone k during SYNC symbol position t is denoted as $e_{i,k}^t$.

The VCU 130 correlates T error samples $\{e_{i,K-k}^t\}_{t=t_0 \ldots t_0+T-1}$ as measured over a given victim 17a/35b line Li at tone K−k during a complete acquisition cycle with the T corresponding pilot digits $\{w_{j \neq i,K-k}^t\}_{t=t_0 \ldots t_0+T-1}$ transmitted over a given disturber 17a/35b line Lj at tone K−k so as to obtain an estimate of the linear crosstalk coefficient Hi, j, K−k, K−k from the disturber line Lj and disturber tone K−k into the victim line Li and victim tone K−k (normalized wrt respective FEQ coefficients). Likewise, the VCU 130 correlates T error samples $\{e_{i,K+k}^t\}_{t=t_0 \ldots t_0+T-1}$ as measured over a given victim 35b line Li at tone K+k with the T pilot digits $\{w_{j \neq i,K+k}^t\}_{t=t_0 \ldots t_0+T-1}$ of the pilot sequence transmitted over a given disturber 35b line Lj at tone K+k so as to obtain an estimate of the linear crosstalk coefficient Hi, j, K+k, K+k from the disturber line Lj and disturber tone K+k into the victim line Li and victim tone K+k. Still likewise, the VCU 130 correlates T error samples $\{e_{i,K-k}^t\}_{t=t_0 \ldots t_0+T-1}$ as measured over a given victim 17a line Li at tone K−k with the T pilot digits $\{w_{j \neq i,K+k}^t\}_{t=t_0 \ldots t_0+T-1}$ of the pilot sequence transmitted over a given disturber 35b line Lj at tone K+k so as to obtain an estimate of the alias crosstalk coefficient Hi, j, K−k, K+k from the disturber line Lj and disturber tone K+k into the victim line Li and victim tone K−k. And still likewise, the VCU 130 correlates T error samples $\{e_{i,K+k}^t\}_{t=t_0 \ldots t_0+T-1}$ as measured over a given victim 35b line Li at tone K+k with the T pilot digits $\{w_{j \neq i,K-k}^t\}_{t=t_0 \ldots t_0+T-1}$ of the pilot sequence transmitted over a given disturber 17a line Lj at tone K−k so as to obtain an estimate of the alias crosstalk coefficient Hi, j, K+k, K−k from the disturber line Lj and disturber tone K−k into the victim line Li and victim tone K+k. As the pilot sequences used over the lower and upper tones are mutually orthogonal, the contributions from the other disturber lines and from the mirrored tones reduce to zero after this correlation step, except for the targeted crosstalk coefficient.

Care should be taken that not all tones of VDSL2 SYNC symbols are pilot tones. Instead, there are two flag tones every tones for SYNC FLAG acknowledgment, respectively at tone positions 10k+1 and 10k+7. If a pilot tone is mirrored back into a flag tone, or vice-versa, then the alias crosstalk coefficient cannot be estimated at the given frequency index as no pilot signal and/or no error measurements are available at those frequencies. So, one shall properly discard any such tones for estimation of the alias crosstalk channels, and then rely on some interpolation across frequency to derive the alias crosstalk coefficients at missing frequencies.

Ideally, one could redefine the positions of the pilot tones such that any pilot tone in the lower frequency range is mirrored onto another pilot tone in the extended frequency range, and vice-versa. For instance, one could stick to the current pattern for the lower range from 0 to K−1, namely flag tones defined at tone positions 10k+1 and 10k+7 and pilot tones elsewhere, and then define flag tones at positions K+10k+5 and K+10k+9 and pilot tones elsewhere for the extended range from K to 2K−1, such that the upper flag tones, respectively the upper pilot tones, are mirrored back onto the lower flag tones, respectively the lower pilot tones, and vice-versa.

Some further tones are to be discarded when FDPS is used. Indeed, one may be unable to discriminate between the pilot sequence transmitted over a given line at tone K−k and the pilot sequence transmitted over the same given line at tone K+k if both tones use the same FDPS discrimination window, that is to say if both tones use the same relative position in the FDPS periodic pattern. Then the crosstalk coefficients that describe the alias couplings between tone K−k and tone K+k within a same 35b line cannot be obtained by correlation as orthogonality is lost between the corresponding two pilot sequences. As aforementioned, such alias crosstalk is anyhow expected to be negligible if the crosstalk is not too strong.

Also, it is noteworthy that a downstream tone can be mirrored onto an upstream tone depending on the respective positions of the various downstream and upstream communication bands. Yet that should not be the case around the folding frequency, wherein the alias crosstalk is predominant.

The VCU 130 estimates the channel matrix HK±k from the interference measurements and the correlation results, and updates the precoding matrix PK±k or postcoding matrix QK±k from these channel estimates.

The performance of signal vectoring depends critically on the coefficient values of the precoding and postcoding matrix. Not only shall these values be accurately computed from noisy estimates of the various and varying channel couplings, but also a trade-off is to be found between completely eliminating inter-channel interference without any regard to how much energy of the signal of interest is lost in this process, and preserving as much energy content of the signal of interest as possible at the cost of possibly facing higher inter-channel interference.

For instance, the precoding matrix PK±k or postcoding matrix QK±k can be computed as the matrix inverse of the channel matrix HK±k, meaning that the off-diagonal coefficients of the overall channel matrix HK±kPK±k or QK±kHK±k, and thus the inter-channel interference, mostly reduce to zero. Such "diagonalizing" precoders and postcoders are characterized as zero-Forcing (ZF) as they seek to null-out the crosstalk interference terms. ZF is very effective with MIMO channels that are diagonally dominant and hence well-conditioned, which is typically the case up to VDSL2 17a transmit profile at least. The inverse of the channel matrix can be computed or approximated with explicit "one-shot" algorithms that give excellent performance (e.g., first-order matrix inversion if the normalized crosstalk coefficients are negligible wrt unity).

Iterative algorithms can also be used for updating the precoding or postcoding matrix in a so-called 'tracking' mode. For instance, the easy-to-implement additive, multiplicative or Least Mean Square (LMS) iterative update algorithms have proven to work flawlessly and to achieve most of the vectoring gains with VDSL2 systems. Each iteration is based on a new observation of the residual crosstalk as the SYNC symbols are passed through the precoder or postcoder, which has been configured with the coefficient values computed during the previous iteration. The new observed residual crosstalk determines in which direction the precoder or postcoder shall be driven to lower e.g. the Mean Square Error (MSE) or to approach the exact channel inverse.

Figure 4:
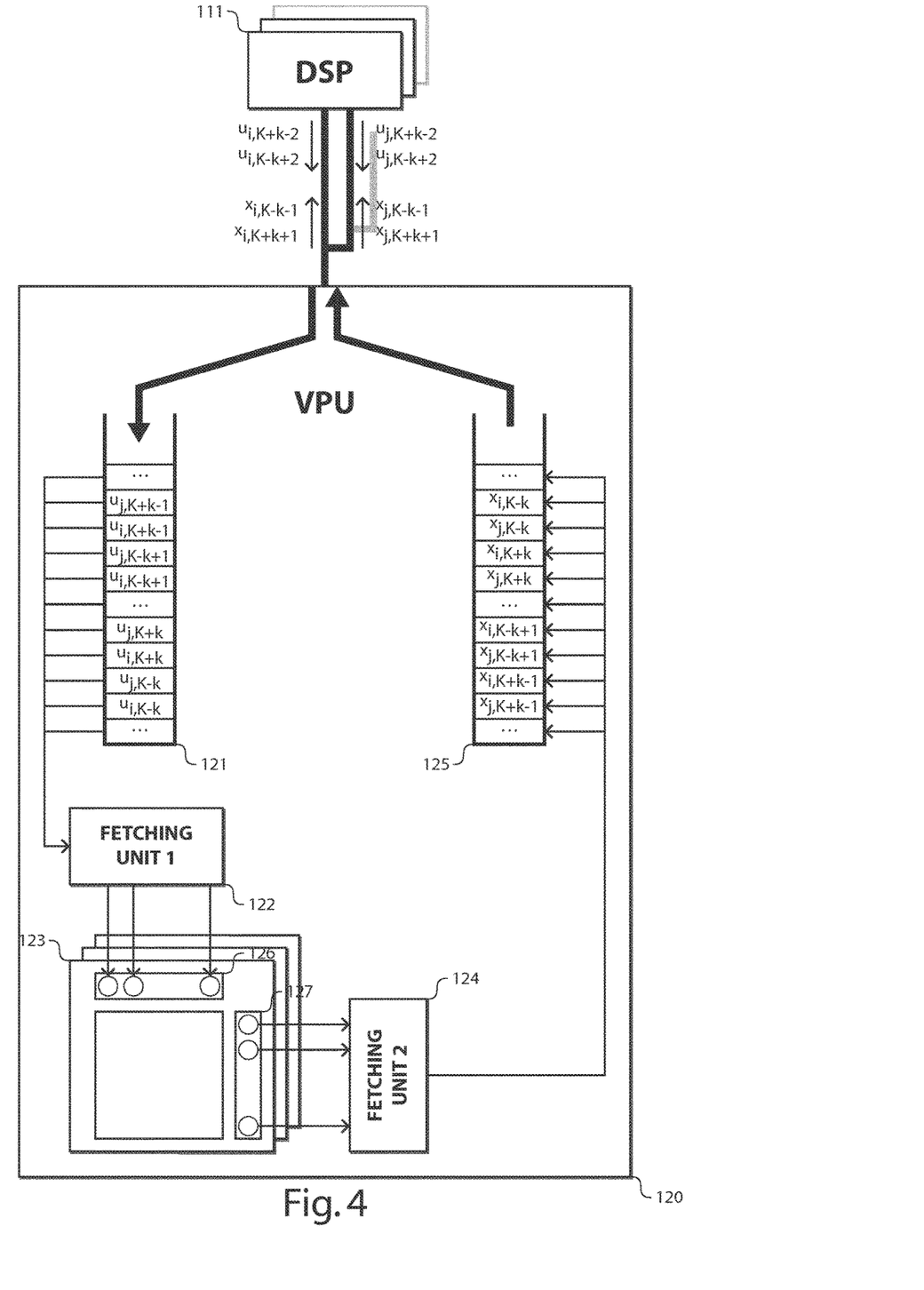
FIGS. 4 and 5 represent further details about a vectoring processor.
Figure 5:
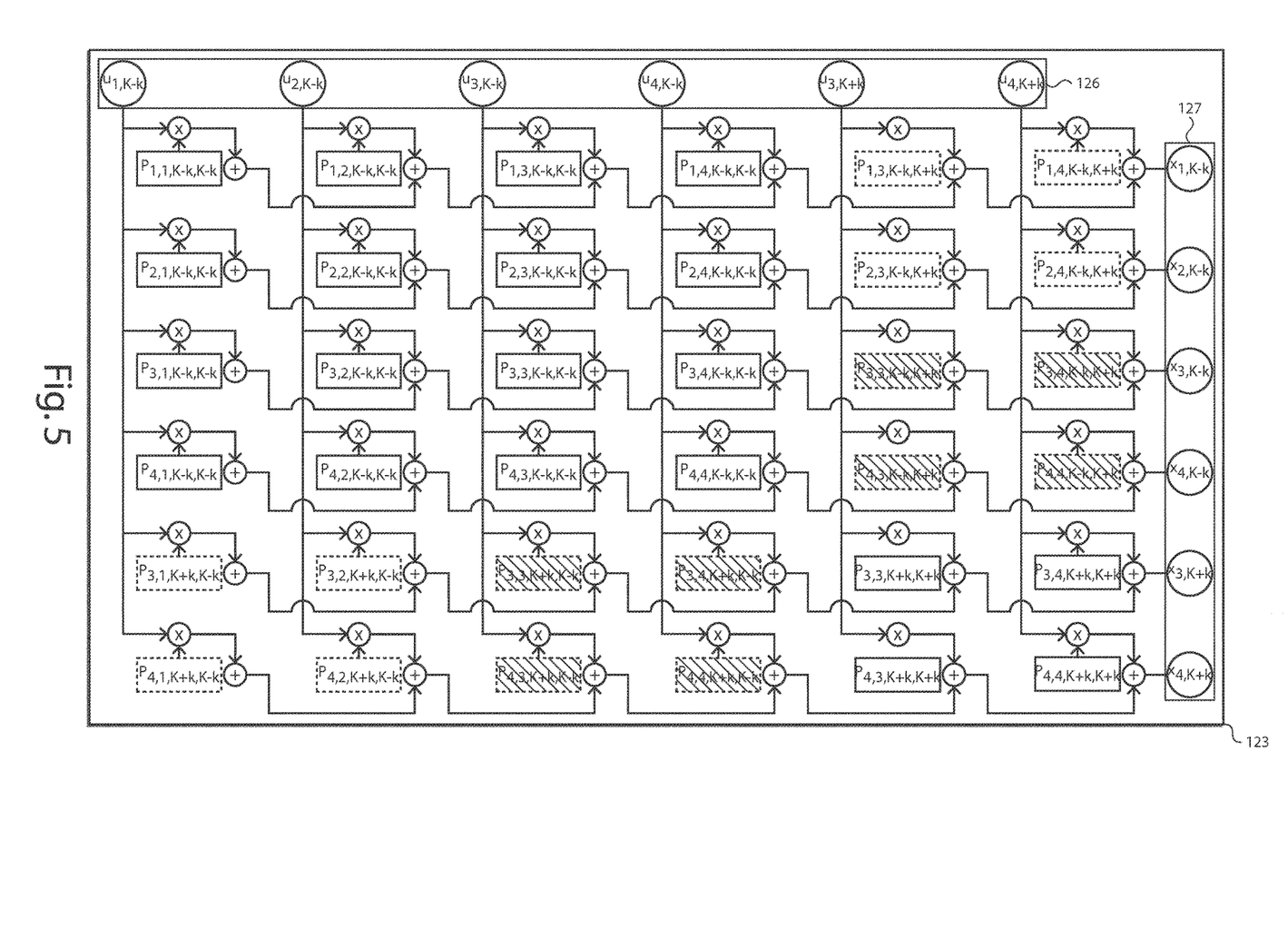

There is seen in FIGS. 4 and 5 further details about the VPU 120.

The VPU 120 is shown in FIG. 4 as comprising:
a first incoming buffer queue 121;
a first fetching unit 122;
several parallel processing pipes 123;
a second fetching unit 124; and
a second outgoing buffer queue 125.

The incoming frequency samples from the DSPs 111 that need to be pre or post-compensated for both the linear and alias crosstalk are stored in the buffer queue 121 pending for further joint processing.

When the frequency samples at a given tone K−k, and if applicable at the mirrored tone K+k, are available in the buffer queue 121 for all the vectored lines, then the fetching unit 122 selects a free processing pipe out of the processing pipes 123 and writes the frequency samples in the corresponding incoming register memories 126 of the selected processing pipe, thereby freeing up the corresponding memory in the buffer queue 121 for further incoming samples.

The processing pipes 123 pre or post-compensate for both the linear and alias crosstalk by multiplying all frequency data samples at both tones K−k and K+k by the precoding or postcoding matrix. As a result of this operation, new pre or post-compensated frequency samples at both tones K−k and K+k are available in the outgoing register memories 127 for further retrieval by the fetching unit 124.

When the joint processing of the frequency samples has completed, the fetching unit 124 pushes the pre or post-compensated frequency samples from the outgoing register memories 127 into the buffer queue 125 for further transmission towards the DSPs 111.

By alternating frequency samples at lower tones K−k with respective frequency samples at upper mirrored tones K+k at the input of the VPU 120, minimum residence time is achieved in the incoming buffer queue 121 since all the necessary tone data at both tones K−k and K+k are readily available and straightaway pulled off from the incoming buffer queue 121 for processing by the processing pipes 123. The required size of the incoming buffer queue 121 is thus substantially reduced, and so is the incurred latency in the data processing path.

For instance, and assuming perfect synchronization between the DSPs 111 when supplying frequency samples to the VPU 120, one can afford an incoming buffer queue as small as (N+M) samples plus some margin, provided the lower tone data and the upper mirrored tone data are alternated on a per tone basis.

There is seen in FIG. 5 further details about the individual processing pipes 123 for signal precoding. The use case of FIG. 1 with 4 vectored lines, wherein lines $L_1$ and $L_2$ are 17a lines while lines $L_3$ and $L_4$ are 35b lines, is taken as a reference for illustration purpose.

The precoding coefficients for the mitigation of the linear crosstalk are plotted with solid lines, while the precoding coefficients for the mitigation of the alias crosstalk are plotted with dashed lines. Also, the cross-hatched precoding coefficients are for the mitigation of the alias crosstalk within and between 35b lines: they are typically set to zero if second order effects are not accounted for (i.e., if crosstalk is not too strong). The diagonal precoding coefficients corresponds to the direct channel gains, and are typically set to one or slightly below.

Each processing pipe comprises many parallel Multiply and Accumulate (MAC) units. Each MAC unit takes an incoming complex frequency sample $u_i$, K−k from the lower range or $u_i$, K+k from the upper range and the corresponding complex precoding coefficient as inputs, and outputs their complex product, which is then accumulated with the outputs of the other MAC units belonging to the same row (i.e., for the same victim line and victim tone). The result of the row-wise accumulate operations yields the respective pre-compensated frequency samples $x_{1\ldots4,K-k}$ in the lower range and $x_{3\ldots4,K+k}$ in the upper range.

Although the above description was made with reference to VDSL2 communications with the concurrent use of 17a and 35b VDSL2 transmit profiles, the present invention is equally applicable to G.fast communications with the concurrent use of G.fast 106a (or 106b) and 212a transmit profiles.

G.fast communication makes use of Time Duplexing Division (TDD) where downstream and upstream communications operate over the same frequency band but in distinct and non-overlapping time slots. In this case, the hybrid can be advantageously omitted in the AFEs 112 and 212 as the transmitter and receiver operate in alternate mode: the receive circuitry is switched OFF (or the receive signal is discarded) while the transmit circuitry is active, and the way around, the transmit circuitry is switched OFF while the receive circuitry is active. Consequently, there is no folding of downstream tones over upstream tones as per VDSL2.

Another noticeable difference with VDSL2 is the addition of the zero-power constellation point '0+0j' for modulation of the pilot tones, and the ability to measure and report receive raw DFT samples during SYNC symbols. The latter allows the characterization of the raw unnormalized channel matrix, e.g. for avoiding clipping of the slicer error in strong crosstalk environments or for computing bit loading values for downstream tones at CO side.

Also, since G.fast works at much higher frequencies, the channels are often non-diagonally dominant, and sometimes even ill-conditioned, and ZF can be far from optimal: the channel inverse yields too large vectoring coefficients that cause a substantial increase of the transmit power (precoding) or of the background noise (postcoding). The increase of the transmit power directly translates into lower direct signal gains for power-constrained systems that shall keep their transmit power within the allowable bounds (transmit PSD mask, per-line transmit power, total aggregate transmit power), leading to poor channel utilization and low data rates for the end users. Likewise, the increase of the background noise severely degrades the signal to Noise Ratio (SNR) and thus the achievable data rate.

If the channel is good-conditioned, then one can still use ZF, yet the exact channel inverse is to be computed, which has O(N3) complexity order, as the second order effects may no longer be negligible. Yet, the added complexity should be balanced by the size of the vectoring group, which is expected to be far smaller in G.fast than in VDSL2.

If the channel is bad-conditioned, then one could use iterative algorithms which do not require any kind of channel structure, such as diagonal dominance, for good performance. An example of such an iterative algorithm is the iterative Minimum Mean squared Error (iMMSE) algorithm. Else, one can rely on the so-called 'tone suppression' technique to restore the good-conditioning of the channel matrix at the expense of tones being suppressed for direct communication over given lines.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, Digital Signal Processor (DSP) hardware, network processor, Application Specific Integrated circuit (ASIC), Field Programmable Gate Array (FPGA), etc. Other hardware, conventional and/or custom, such as Read only Memory (ROM), Random Access Memory (RAM), and non volatile storage, may also be included.

The invention claimed is:

1. A method for jointly processing Discrete Multi-Tone (DMT) communication signals making use of a common tone spacing, the method comprising:

processing, by a processor, the DMT communication signals to be transmitted over a plurality of subscriber lines, or respectively received from the plurality of subscriber lines, a first portion of DMT communication signals over a first subset of the plurality of subscriber lines being confined within a first transmit spectrum, and a second portion of DMT communication signals over a second subset of the plurality of subscriber lines being confined within an extended second transmit spectrum that is a frequency extension of the first transmit spectrum, wherein the first subset and the second subset are disjoint, wherein the method further includes inputting, to a vector processor, first groups of frequency samples to be transmitted over, or respectively received from, the first and second subsets of the plurality of subscriber lines at respective first tones and following a first group selection order, and inputting, to the vector processor, the first groups of frequency samples alternated with mirrored second groups of frequency samples to be transmitted over, or respectively received from, the second subset of the plurality of subscriber lines at respective second tones, the mirrored second groups of frequency samples following a second group selection order, wherein the first groups and the mirrored second groups of frequency samples are input to the vector processor for joint mitigation of first crosstalk present over the first and second subsets of the plurality of subscriber lines at the respective first tones and second crosstalk present over the second subset of the plurality of subscriber lines at the respective second tones, wherein the second tones are respective mirrored versions of the first tones, and the second group selection order is a mirrored version of the first group selection order, wherein the first tones are common to the first transmit spectrum and the extended second transmit spectrum, and wherein mirroring is with respect to a folding frequency derived from a reference sampling frequency applicable to the first subset of the plurality of subscriber lines.

2. The method according to claim 1, wherein
the first tones span from a first given tone up to the folding frequency, and
the second tones span from the folding frequency up to a given one of the second tones.

3. The method according to claim 1, wherein the first and second groups of frequency samples individually include an equal number of consecutive frequency samples greater than or equal to one.

4. The method according to claim 3, wherein
the first group selection order corresponds to groups with one of an increasing tone index or a decreasing tone index, and
the second group selection order corresponds to groups with the other of the increasing tone index or the decreasing tone index.

5. The method according to claim 1, wherein the first crosstalk includes first nominal crosstalk caused by DMT communication signals transmitted at the first tones over the first and second subsets of the plurality of subscriber lines and that linearly interfere with respective ones of the first and second subsets of the plurality of subscriber lines, and first aliased crosstalk caused by DMT communication signals transmitted at the second tones over the second subset of the plurality of subscriber lines that linearly interfere with respective ones of the first subset of the plurality of subscriber lines, and that are backward-folded over mirrored ones of the first tones on account of signal sampling over the first subset of the plurality of subscriber lines at the reference sampling frequency.

6. The method according to claim 1, wherein the second crosstalk includes second nominal crosstalk caused by DMT communication signals transmitted at the second tones over the second subset of the plurality of subscriber lines, and that linearly interfere with respective ones of the second subset of the plurality of subscriber lines, and second aliased crosstalk caused by DMT communication signals transmitted at the first tones over the first subset of the plurality of subscriber lines that are forward-folded over the second tones on account of signal synthesis over the first subset of the plurality of subscriber lines at the reference sampling frequency, and that linearly interfere with respective ones of the second subset of the plurality of subscriber lines.

7. The method according to claim 1, further comprising:

assigning first pilot sequences to respective transceivers coupled to the first and second subsets of the plurality of subscriber lines for modulation of first pilot signals transmitted at the first tones;

assigning second pilot sequences to respective transceivers coupled to the second subset of the plurality of subscriber lines for modulation of second pilot signals transmitted at the second tones; wherein
the first and second pilot sequences are mutually orthogonal.

8. The method according to claim 7, further comprising:

selecting the first pilot sequences from a first subset of a plurality of mutually orthogonal pilot sequences; and selecting the second pilot sequences from a second subset of the plurality of mutually orthogonal pilot sequences; wherein
the first subset of the plurality of mutually orthogonal pilot sequences and the second subset of the plurality of mutually orthogonal pilot sequences are disjoint.

9. The method according to claim 7, further comprising:

transmitting the second pilot signals at the second tones over the second subset of the plurality of subscriber lines;

measuring first induced interference at mirrored ones of the first tones over the first subset of the plurality of subscriber lines; and characterizing first aliased crosstalk from the measured first induced interference and the transmitted second pilot signals.

10. The method according to claim 7, further comprising:

transmitting the first pilot signals at the first tones over the first and second subsets of the plurality of subscriber lines;

measuring second induced interference at the second tones over the second subset of the plurality of subscriber lines; and characterizing second aliased crosstalk from the measured second induced interference and the transmitted first pilot signals.

11. A processor for digitally processing Discrete Multi-Tone DMT communication signals to be transmitted over at least one subscriber line of a plurality of subscriber lines, or respectively received from the at least one subscriber line of the plurality of subscriber lines, the processor configured to:
- input, to a vector processor, first groups of frequency samples to be transmitted over, or respectively received from, the at least one subscriber line at respective first tones and following a first group selection order,
- input, to the vector processor, the first groups of frequency samples alternated with mirrored second groups of frequency samples to be transmitted over, or respectively received from, the at least one subscriber line at respective second tones, the mirrored second groups of frequency samples following a second group selection order,
- wherein the first groups and the mirrored second groups of frequency samples are input to the vector processor for joint mitigation of first crosstalk present over the at least one subscriber line at the respective first tones and second crosstalk present over the at least one subscriber line at the respective second tones,
- wherein the second tones are respective mirrored versions of the first tones, and the second group selection order is a mirrored version of the first group selection order,
- wherein the first tones are common to a first transmit spectrum and an extended second transmit spectrum, the first transmit spectrum used over a first subset of the plurality of subscriber lines, and the extended second transmit spectrum used over a second subset of the plurality of subscriber lines, the extended second transmit spectrum being a frequency extension of the first transmit spectrum, and the second subset of the plurality of subscriber lines including the at least one subscriber line,
- wherein the first subset and the second subset are disjoint, and
- wherein mirroring is with respect to a folding frequency derived from a reference sampling frequency applicable to the first subset of the plurality of subscriber lines.

12. An access node comprising the at least one processor according to claim 11.

13. An access node according to claim 12, wherein the access node is a Digital Subscriber Line Access Multiplexer (DSLAM).

14. An access node according to claim 12, wherein the access node is a Distribution Point Unit (DPU).

* * * * *